Jan. 7, 1964 L. A. MEACHAM Re. 25,507

TELEPHONE SUBSTATION APPARATUS

Original Filed Dec. 16, 1959

INVENTOR
L. A. MEACHAM
BY Edwin B. Cave
ATTORNEY

United States Patent Office

Re. 25,507
Reissued Jan. 7, 1964

25,507
TELEPHONE SUBSTATION APPARATUS

Larned A. Meacham, Colts Neck, N.J., assignor to Bell Telephone Laboratories, Incorporated, New York, N.Y., a corporation of New York Original No. 3,064,084, dated Nov. 13, 1962, Ser. No. 859,936, Dec. 16, 1959. Application for reissue Dec. 26, 1962, Ser. No. 247,799
7 Claims. (Cl. 179—81)

Matter enclosed in heavy brackets [ ] appears in the original patent but forms no part of this reissue specification; matter printed in italics indicates the additions made by reissue.

This invention relates to telephone substation apparatus and more particularly to transistorized calling signal generators for telephone sets.

In my patent application Serial No. 759, 474, filed September 8, 1958, I disclose a multifrequency calling signal generator for telephone subscriber sets employing a single transistor oscillator operative to generate two selected frequencies for each digit upon the operation of any of a series of pushbuttons. Ten such pushbuttons, each arranged to select a different pair of frequencies, allow the coding of subscriber calling information.

As proposed in my earlier application, the calling signal generator is, in effect, connected across a resistor which, when a pushbutton is operated, itself is connected in series with the two telephone line conductors whereby power for the transistor oscillator is obtained from the voltage drop across that resistor. When no pushbutton is operated, the speech circuit is connected across the line conductors as in standard telephone practice and the telephone transmitter is likewise powered by the supervisory direct current on the line, supplied from the telephone central office.

It has been found that this arrangement is satisfactory for both speech and pushbutton signaling but certain limitations have been encountered. First, the series resistor absorbs fifty percent or more of the signaling power so that it has been necessary to operate the calling signal oscillator at a high level in order that this absorption along with the normal attenuation over the longest line still does not lower the level of the received calling signal below the point at which the presence of interfering voltages such as dial tone can prevent its detection by the central office calling signal receiver. Such a limitation imposes rather severe operating conditions for the oscillator on long loops and in particular produces a problem of excessive dissipation in the transistor on short loops.

Another difficulty occurs in connection with the aforemention change of connection effectively to replace the speech circuit with the resistor and transistor oscillator each time a pushbutton is operated. With this circuit change there is a change in the over-all set resistance from the normal 200 ohms to approximately 600 ohms. Therefore, with each pushbutton operation in addition to the two calling frequencies generated and transmitted from the telephone set there is also a stepwise reduction in the direct current on the telephone line. The drop in direct current can be sufficient to cause the central office connection to be released. Also, the transient components generated by the direct current step and occurring simultaneously with the calling signal constitute interference.

One further limitation in the multifrequency pushbutton calling arrangement is that the phenomenon known as frequency twist or unequal attenuation of different frequencies during transmission results in the two signaling components being of substantially different amplitude after transmission over a long loop. This difference in amplitude handicaps the signal in competing with dial tone or other interference, as noted above, for proper detection by the central office receiver.

With these limitations in mind, it is a general object of this invention to improve the operation of multifrequency telephone calling apparatus.

Another object of this invention is to increase the signaling efficiency of the pushbutton calling circuits in a telephone set.

Another object of this invention is to maintain a substantially uniform telephone set resistance during both speech and pushbutton calling.

Still another object of this invention is provide frequency compensation for multifrequency calling signals.

These objects are attained in accordance with this invention, one embodiment of which is shown in the drawing. It comprises an integrated speech and calling signal-generating circuit having a single pair of line terminals to which the speech circuit including a transmitter, a receiver, an induction coil, and a line-balacing network are all connected in conjugate relationship, as is standard in the telephone art. Normally bridged across the induction coil through a transfer switch are a pair of series-connected tank circuits having selected tuning taps under the control of an array of pushbuttons. The inductor of each tank circuit has two closely coupled additional windings, connected respectively in the emitter circuit and the base circuit of a transistor. This arrangement provides a path for coupling energy from the output to the input of the transistor to establish the conditions for oscillation generation. The transmitter of the telephone circuit is connected through a back contact of the transfer switch whereupon operation of any of the pushbuttons and consequent operation of the transfer switch causes the transmitter circuit to be opened. The receiver is also connected through a back contact of this switch, so that the signal tones produced while a pushbutton is pressed do not sound excessively loud to the subscriber. At the same time the emitter-collector circuit of the transistor is connected across a portion of the induction coil and the line-balancing network of the speech circuit for coupling energy out of the calling signal generator and onto the telephone line.

One feature of this invention resides in the alternate connection of the telephone transmitter and multifrequency calling signal generator into the induction coil circuit with each operation of the calling signal pushbutton.

Another feature of this invention relates to the coupling of the transistor oscillator to only a fractional portion of the induction coil to use the induction coil as an autotransformer during signaling.

One other feature of this invention is the coupling of the transistor oscillator to the anti-sidetone network to provide frequency-compensation for the calling signal generator.

Still another feature of this invention is the utilization of the nonlinear loop-equalizing elements of the speech transmission network as supply voltage limiters for the calling signal oscillator.

These and other features of this invention may be more clearly understood from the following detailed description and by reference to the drawing in which.

Figure 1:
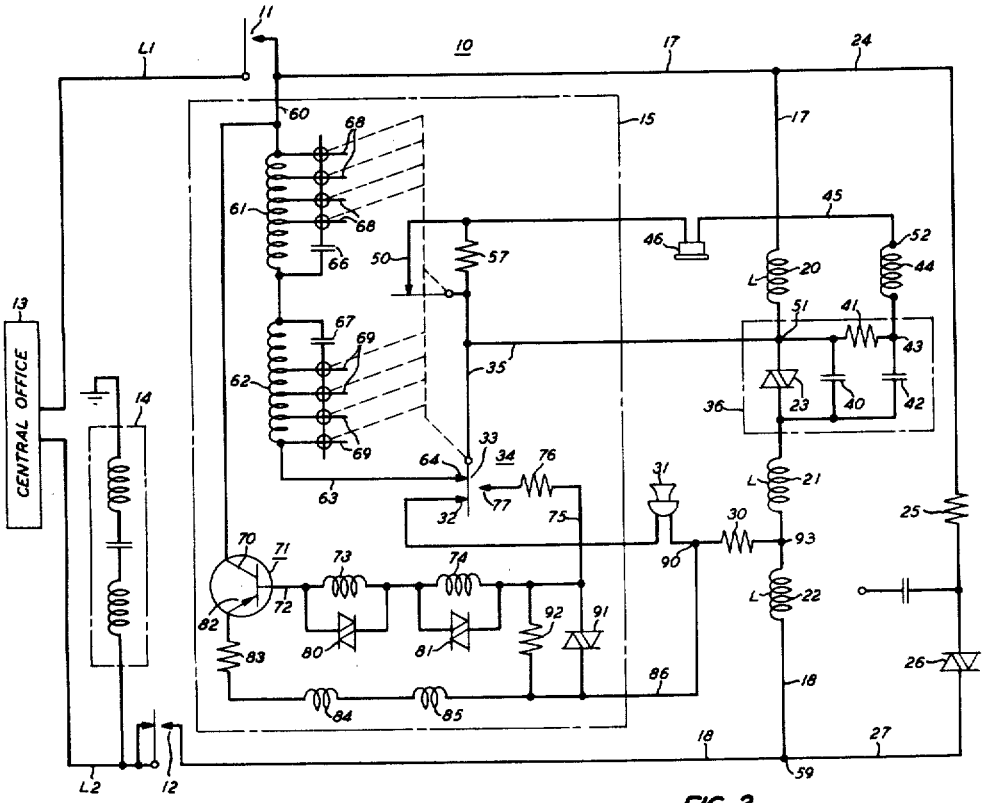
FIG. 1 is an electrical schematic representation of a telephone substation circuit in accordance with this invention.

Referring now to the drawing, FIG. 1 shows a telephone subscriber circuit 10 connected through a pair of switchhook contacts 11 and 12 to a pair of line conductors L1 and L2 to a telephone central office 13 including a calling signal receiver of the type disclosed in my patent application Serial No. 743,434, filed June 20, 1958. Connected between the line conductor L2 and ground is a conventional telephone ringer 14.

Branching from switchhook contact 11 is the calling signal generator 15 hereinafter described, and bridged across the switchhook contacts 11 and 12 is the induction coil L, including series-aiding windings 20, 21, and 22, with a nonlinear resistance element 23, for example, a Western Electric 312E silicon carbide varistor in series between windings 20 and 21. Another bridging path includes conductor 24, resistance 25, and a varistor 26 of a type similar to varistor 23, for example, a Western Electric 312D varistor, and conductor 27. The nonlinear characteristics of varistors 23 and 26 are employed for loop equalization; that is, to control, as a function of loop length, both the transmitting and receiving sensitivities of the telephone set, and at the same time to maintain a required degree of sidetone suppression.

Connected to the junction between windings 21 and 22 of the induction coil L is the transmitter branch including a small series resistor 30, the telephone transmitter 31, a back contact 32 and the armature 33 of transfer switch 34 as well as a conductor 35 terminating at the junction between the varistor 23 and winding 20. The telephone transmitter 31 is therefore bridged across winding 21 and varistor 23 when the switch 34 is in its unoperated condition.

The varistor 23 is a nonlinear element of the anti-sidetone network 36, which includes, additionally, shunted across this varistor, a small capacitor 40 of approximately 0.04 microfarad and also a resistor 41 in series with a larger capacitor 42 in the order of 2 microfarads.

The telephone receiver branch extends from terminal 43 of the anti-sidetone network 36 through winding 44 which is coupled in series-aiding relationship to induction coil L, conductor 45, receiver 46, shorting contact 50 of switch 34 and the conductor 35 to junction 51. In the presence of speech currents at the transmitter, the voltage induced in the winding 44 between the terminals 43 and 52, due to coupling to the induction coil, is approximately equal to, and in phase with, the voltage developed across the sidetone network terminals 43 and 51. Consequently, the voltage between the junctions 51 and 52 across which the receiver is connected is approximately zero in the presence of local speech. This is a classic form of anti-sidetone speech circuit with its success depending on the relationship between the impedance of the anti-sidestone network 36 and that presented to the set by the line L1, L2.

In addition to the speech circuit described above, a branch from the switchhook contact 11 over conductor 60 extends to a pair of series-connected coils 61 and 62 with capacitors 66 and 67 arranged to be connected across the respective coils 61 and 62 upon operation of one of the calling pushbuttons, unshown, which closes one each of crosspoints 68 and 69. This branch extends through conductor 63, a second back contact 64 of the switch 34, and conductor 35 to junction 51. These windings 61 and 62 are therefore normally in shunt with winding 20 of induction coil L. When the telephone set is connected to the telephone line and the switch 34 is in its unoperated condition, a portion of the line current passes through the windings 61 and 62 while the majority of the line current passes through winding 20 of induction coil L. When the switch 34 is operated the path through windings 61 and 62 is interrupted.

A second branch from conductor 60 constitutes the collector circuit 70 of a transistor 71. The transistor 71 includes a base electrode 72 with a pair of series-connected windings 73 and 74 connected via conductor 75 and a resistor 76 to the front contact 77 of switch 34. Individually bridging the windings 73 and 74 are varistors 80 and 81, for example, two Western Electric 100A silicon varistors, the nonlinear resistance characteristics of which respectively control the magnitude of any alternating-current voltages developed across windings 73 and 74. Transistor 71 includes also an emitter electrode 82 connected through a resistor 83, series coils 84 and 85, the conductor 86 to the telephone transmitter branch at junction 90. Coils 61, 73 and 84 are windings on a common core and have close magnetic intercoupling. Similarly, coils 62, 74 and 85 are closely intercoupled. Base bias for the transistor 71 is derived across the varistor 91 and resistor 92 which, together with resistor 76 form a voltage divider between points 51 and 90 when switch 34 is operated.

The operation of the ringer and speech circuits of this substation circuit are not modified from the prior art. In particular, the ringer will be energized when a ringing signal is applied at the central office between ground and conductor L2.

In so far as the speech circuit is concerned, lifting of the conventional handset from the base of the telephone set allows the switchhook contacts 11 and 12 to close and supervisory current to flow through the line conductors L1 and L2 into the speech circuit through the winding 20 on conductor 35, the armature 33 and back contact 32 of the switch 34, the transmitter 31, resistor 30, winding 22 and line conductor L2. This direct current energizes the telephone transmitter 31. Local speech at the transmitter is introduced into the induction coil branch between the terminals 51 and 93 and then by autotransformer action employing windings 20, 21 and 22 into the line conductors L1 and L2. As indicated above, the speech voltage induced in winding 44 coupled to the induction coil is substantially equaled by the voltage drop in the anti-sidetone network across terminals 43 and 51 and therefore there is no voltage developed across the terminals 51 and 52. Incoming speech over the line L1 and L2 is not balanced out and reaches the receiver branch where it is audible to the listener at the receiver 46.

The calling mechanism employs a plurality of pushbuttons, at least ten in number, the operation of any one of which causes the generation of two tones, lasting as long as the button is held down. While a button is depressed the speech circuit is disabled.

The operation of a pushbutton results in the actuation of three switches, that is, one of the crosspoints 68, one of the crosspoints 69, and lastly the common switch 34 which includes contast 50. In the drawing switch 34 is shown in the normal (speech) condition.

Whether or not a pushbutton is pressed, operation of the telephone set depends upon direct current supplied over the line conductors L1 and L2 from the telephone central office 13. Whenever the telephone handset is lifted and the line contcats 11 and 12 are closed, direct current of between 25 and 200 milliamperes, depending in part upon the length of loop from the substation to the central office, flows through the conductors L1 and L2. On a normal or short loop the primary direct current path is from the line conductor L1 through line switch 11, conductor 17, induction coil windings 20, 21 and 22 and the intermediate varistor 23, return conductor 18, switchhook contact 12 and line conductor L2. An additional direct current path is through conductor 24, resistor 25, varistor 26 and conductor 27. These paths combine to give the set a low resistance and thus to maintain a low voltage across the line conductors L1 and L2. Direct current is supplied selectively to the transmitter 31 or to the transistor 71 from the voltage drop primarily across the varistor 23.

On short loops, the alternating-current resistance as well as the direct-current resistance of both varistors 23 and 26 are reduced relative to their corresponding resistances on long loops by the increased current which they conduct. As a result, varistor 26 reduces the transmitting and receiving sensitivities of the telephone set more on short loops than on long, by acting as a variable shunt between the loop conductors L1 and L2. Simultaneously, the variation in alternating-current resistance of varistor 23 changes the effective impedance of the anti-sidetone network 36 in such a way as to compensate for the changes in effective line impedance produced by varistor 26 and thus preserve satisfactory sidetone suppression. This action, old in the art, is known as loop equalization. It tends to adjust station set sensitivities to correct for differences in transmission to the central office.

During the off-hook but nonsignaling condition the collector current of transistor 71 is effectively zero. The emitter and base of the transistor 71 are at substantially the same voltage since no base bias is applied through contact 77 of switch 34.

The principal direct current voltage drop in the entire telephone set occurs between the terminals 51 and 59. On a maximum subscribed loop this drop falls to about 4 volts. On an extremely short loop its rise is restricted by the varistor 23 to about 10 volts. For collector currents regulated at about 10 milliamperes by the biasing diodes 91, excessive dissipation in the transistor is eliminated. The varistor 23 having a primary function as a nonlinear element of the anti-sidetone network 36 and the varistor 26 having a primary function as a nonlinear element to regulate speech transmission combine to serve the additional function of regulating the collector voltage and hence the power which must be dissipated during pushbutton signaling by transistor 71.

Whenever a pushbutton is operated the two taps corresponding to the pair of frequencies indicative of the digit are closed and immediately thereafter switch 34 is actuated. The operation of transfer switch 34 opens the transmitter circuit by the opening of contact 32, inserts attenuation in the receiver circuit by the opening of contact 50 which normally shorts resistor 57, enables the transistor oscillator by the establishing of a base bias on a closing of contact 77, and shock-excites both coils 61 and 62 into oscillation by interrupting the direct current through them upon opening of contact 64. The transistor 71, acting as a Class A amplifier, sustains the shock-excited oscillations at amplitudes regulated by varistors 80 and 81, and these oscillations are coupled into the induction coil and thence to the line conductors L1 and L2.

Output is taken from the transistor between the emitter circuit conductor 86 and resistor 30 at terminal 93 and the collector circuit through conductor 60. The voltage amplitude of the calling signals is increased by the autotransformer action of the windings 20, 21 and 22 of the induction coil. With some loss introduced into the calling signal by the presence of resistor 30 and the varistor 23, the induction coil still affords approximately 1.4 to 1 increase in amplitude, thereby allowing the transistor 71 to be operated at lower alternating current voltage and hence lower direct-current collector voltage for the same calling signal levels as heretofore were available.

Figure 2:
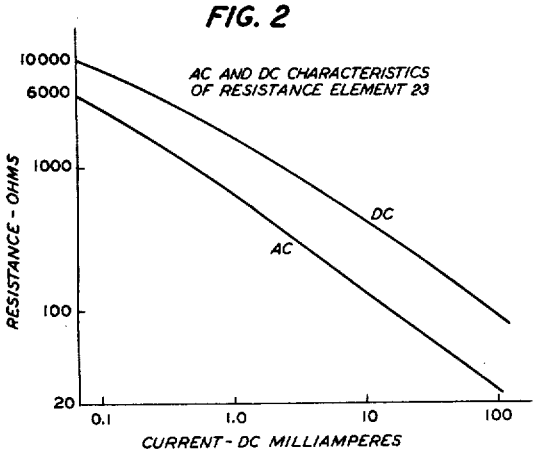
FIG. 2 is a graphical showing of the electrical characteristics of a nonlinear element employed in this invention.
Figure 3:
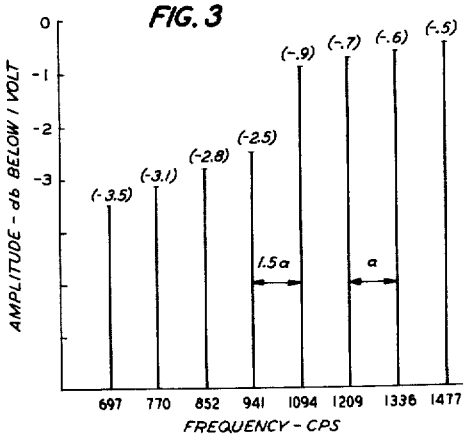
FIG. 3 is a graphical representation of the relative levels of calling signals at the terminals of the subscriber installation.

The presence of the anti-sidetone network 36 including, in particular, the varistor 23, having the characteristics shown in FIG. 2, in the coupling between the calling signal generator and the line has a further advantageous effect. As indicated above, the varistor 23 introduces some attenuation into the transistor calling signals. This varistor 23 is shunted by a capacitor 40 which offers a degree of frequency-compensation in the calling signal. Over the range of calling signals of 679 through 1477 cycles per second there is approximately 2 decibels difference in level of the terminal voltage owing to the presence of the attenuating varistor 23 shunted by the capacitor 40. The introduction of this pre-emphasis of higher signaling frequencies is advantageous particularly on long loops where they are attenuated more than the lower frequencies. An additional pre-emphasis of about 1 decibel is applied by choice of the numbers of turns of the coils 73, 74 across which varistors 80 and 81 are bridged. The over-all effect of these compensations may be seen in FIG. 3 which is a plot of the relative amplitudes versus signaling frequencies.

It may be seen from the above description that the calling transmitter of this invention is supplied with power from the voltage developed across a portion of the anti-sidetone network of the speech circuit and similarly is afforded also a frequency-compensation by the anti-sidetone network.

The induction coil formerly associated solely with the speech circuit in telephone substation installations additionally constitutes an autotransformer for increasing the amplitude of calling signals. The overall telephone set resistance remains now substantially constant during signaling and nonsignaling conditions, since (1) the supply voltage required to generate the signals is reduced, thus permitting this resistance to be low during signaling; (2) the induction coil balancing network and anti-sidetone network all are present during both conditions, (3) the only change affecting the set resistance is the selection of alternating signal sources, to wit, the carbon transmitter or the oscillator, and (4) the resistance effects of this selection are minimized by the nonlinear elements of the anti-sidetone network.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. A telephone substation circuit comprising a line impedance balancing network, said balancing network including a nonlinear impedance element, [a direct-current path including said nonlinear impedance element,] a direct-current path including said nonlinear impedance element, a multifrequency generator comprising a resonant circuit having discretely controllable resonant frequencies and amplifying means [having input and output terminals, said output terminals being coupled to said direct-current path], means for selecting a discrete frequency of said resonant circuit, said resonant circuit being coupled to said amplifying means in such manner as to render said simplifying means capable of producing oscillations at said selected frequency, switch means normally connecting said resonant circuit across [said nonlinear impedance element] *a portion of said direct-current path*, said switch means being actuated by the operation of said discrete frequency selecting means to interrupt said normal connection and connect [the input terminals of] said amplifying means *to derive operating voltage from the voltage drop* across said nonlinear impedance element, *and means coupling the output of said multifrequency generator to said direct-current path.*

2. A telephone substation circuit including a line impedance balancing network, an induction coil comprising a plurality of windings disposed in such manner as to provide autotransformer action, said balancing network including a nonlinear impedance element and a capacitor in shunt with said nonlinear impedance element, a direct-current path including [the windings] *a winding* of said induction coil and said [non-linear] *nonlinear* impedance element, a multifrequency generator comprising a resonant circuit having discretely controllable resonant frequencies and amplifying means [having input and output terminals, said output terminals being connected across a winding of said induction coil], means for selecting a discrete frequency of said resonant circuit, said resonant circuit being coupled to said amplifying means in such manner as to render said amplifying means capable of producing oscillations at said selected frequency, switch means normally connecting said resonant circuit across [said nonlinear impedance element] *a portion of said direct-current path,* said switch means being actuated by the operation of said discrete frequency selecting means to interrupt said normal connection and [connect the input terminals of] *apply to* said amplifying means *current derived from the voltage drop* across said nonlinear impedance element, *and means connecting the output of said multifrequency generator across a winding of said induction coil.*

3. A telephone substation circuit comprising a transmitter, an anti-sidetone network, an inductive element, said anti-sidetone network including a [non-linear] *nonlinear* impedance element, a direct-current path including said nonlinear impedance element and said inductive element, a multifrequency generator comprising a [rsonant] *resonant* circuit having discretely controllable resonant frequencies and amplifying means [having input and output terminals, said output terminals being connected across said inductive element], means for selecting a discrete frequency of said resonant circuit, said resonant circuit being coupled to said amplifying means in such manner as to render said amplifying means capable of producing oscillations at said selected frequency, switch means normally connecting said resonant circuit *across a portion of said direct-current path* and said transmitter across said nonlinear impedance element, said switch means being actuated by the operation of said discrete frequency selecting means to interrupt said normal connections and [connect the input terminals of] *enable* said amplifying means *with operating voltage derived from the voltage drop* across said nonlinear impedance element, *and means connecting the output of said multifrequency generator across said inductive element.*

4. A telephone substation circuit including a transmitter, an anti-sidetone network, an induction coil comprising a plurality of windings disposed in such manner as to provide autotransformer action, said anti-sidetone network including a nonlinear impedance element and a capacitor in shunt with said nonlinear impedance element, a direct-current path including [the windings] *a winding* of said induction coil and said nonlinear impedance element, a multifrequency generator comprising a resonant circuit having discretely controllable resonant frequencies and amplifying means [having input and output terminals, said output terminals being connected across a winding of said induction coil], means for selecting a discrete frequency of said resonant circuit, said resonant circuit being coupled to said amplifying means in such manner as to render said amplifying means capable of producing oscillations at said selected frequency, switch means normally connecting said resonant circuit *across a portion of said direct-current path* and said transmitter across said nonlinear impedance element, said switch means being actuated by the operation of said discrete frequency selecting means to interrupt said normal connections and [connect the input terminals of] *apply to* said amplifying means *current derived from the voltage drop* across said nonlinear impedance element, *and means connecting the output of said multifrequency generator across a winding of said induction coil.*

5. A telephone substation circuit including a transmitter, an anti-sidetone network, an induction coil comprising a plurality of windings disposed in such manner as to provide autotransformer action, said anti-sidetone network including a nonlinear impedance element and a capacitor in shunt with said nonlinear impedance element, a direct-current path including [the windings] *a first and a second winding* of said induction coil and said nonlinear impedance element *serially connected,* a multifrequency generator comprising a resonant circuit having discretely controllable resonant frequencies and amplifying means [having input and output terminals, said output terminals being connected across a winding of said induction coil and said nonlinear impedance element, said winding and nonlinear impedance element being serially connected], means for selecting a discrete frequency of said resonant circuit, said resonant circuit being coupled to said amplifying means in such manner as to render said amplifying means capable of producing oscillations at said selected frequency, switch means normally connecting said resonant circuit *across a winding of said induction coil in said direct-current path* and said transmitter across said nonlinear impedance element and [said] *a* winding of said induction coil *in the direct-current path,* said switch means being actuated by the operation of said discrete frequency selecting means to interrupt said normal connections and connect [the input terminals of] said amplifying means *to derive operating voltage from the voltage drop* across said nonlinear impedance element and [said] *a* winding of said induction coil *in said direct-current path, and means connecting the output of said multifrequency generator across said nonlinear impedance element and a winding of said induction coil in said direct-current path.*

6. *A telephone substation circuit comprising a line impedance balancing network, said balancing network including a nonlinear impedance element, a direct-current path including said nonlinear impedance element, a multifrequency generator comprising a resonant circuit having discretely controllable resonant frequencies and amplifying means, means for selecting a discrete frequency of said resonant circuit, said resonant circuit being coupled across a portion of said direct-current path for storage of energy in said resonant circuit and coupled to said amplifying means in such manner as to render said amplifying means capable of producing oscillations at said selected frequency, switch means actuated by the operation of said discrete frequency selecting means for releasing said stored energy to shock-excite said resonant circuit and enabling said amplifying means with operating voltage derived from the voltage drop across said nonlinear impedance element, and means coupling the output of said multifrequency generator to said direct-current path.*

7. *A telephone substation circuit comprising a line impedance balancing network, said balancing network including a nonlinear impedance element, a direct-current path including said nonlinear impedance element, a multifrequency generator comprising a resonant circuit having discretely controllable resonant frequencies and amplifying means, means for selecting a discrete frequency of said resonant circuit, said resonant circuit being coupled to said amplifying means in such manner as to render said amplifying means capable of producing oscillations at said selected frequency, switch means actuated by the operation of said discrete frequency selecting means for applying to said amplifying means current derived from the voltage drop across said nonlinear impedance element, and means coupling the output of said multifrequency generator to said direct-current path.*

References Cited in the file of this patent or the original patent

UNITED STATES PATENTS

| | | |
|---|---|---|
| 2,801,287 | Clemency | July 30, 1957 |
| 2,846,512 | Crofutt | Aug. 5, 1958 |